April 18, 1939.    A. J. MEIER    2,154,632
SEAL
Original Filed Sept. 8, 1930

INVENTOR.
ALBERT J. MEIER
BY
ATTORNEY.

Patented Apr. 18, 1939

2,154,632

UNITED STATES PATENT OFFICE 2,154,632

SEAL

Albert J. Meier, Glendale, Mo.

Original application September 8, 1930, Serial No. 480,337. Divided and this application December 24, 1935, Serial No. 56,049

4 Claims. (Cl. 286—7)

This invention relates generally to rotating furnaces and particularly to an improved sealing arrangement for use between rotating and stationary parts of furnaces and other devices.

An object of the invention, generally stated, is to provide a seal for preventing the escape of gases or other fluids from the joint between a rotating furnace and an adjacent stationary part.

Another object of the invention is to provide a seal of the type referred to wherein the interior pressure may be balanced by a pressure applied to the exterior of the sealing device.

A further object of the invention is to provide a seal of the type referred to in which wear upon the parts is minimized by continuously removing dust from the seal.

Other objects will become apparent to those skilled in the art when the following description is read in connection with the accompanying drawing, in which.

This application is a division of my copending application Serial No. 480,337, filed September 8, 1930, for improvement in "Process and apparatus for distilling materials".

Generally stated, in accordance with the present invention a seal may be provided for sealing the junction between a rotating part, such as a rotating furnace and an adjacent stationary part thereof. According to one embodiment, the rotating member may be provided with an annular fin near the end thereof which is adjacent the stationary part where the sealing is to be accomplished. A suitable gasket may then be carried by the stationary part and arranged with an annular groove into which the fin on the exterior of the rotating member may fit and move. Suitable means is provided for adjusting the pressure or compression upon the gasket to accomplish the desired sealing. This may be accomplished by mechanical compression as by adjustment of the parts or by applying a fluid pressure to the exterior of the sealing device sufficient to compensate for the fluid pressure on the interior of the furnace. A further feature of the present invention is the provision of an apparatus for continuously removing dust or solid matter from the seal between a rotating and stationary parts of a furnace thereby to reduce the wear upon the parts.

Figure 1:
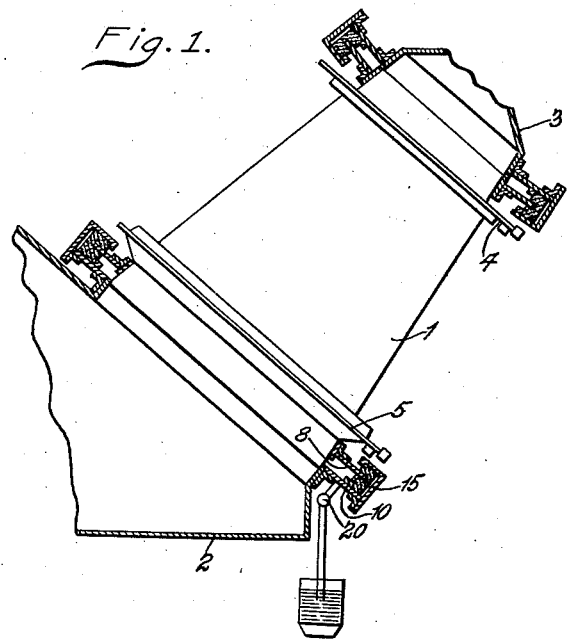
Figure 1 is a view in side elevation, part being in section, and showing a rotating furnace provided with a seal according to the present invention.

Referring now particularly to the drawing, a furnace is shown in Figure 1 which may comprise a rotating part 1 suspended for operation between a stationary part 2 which may be termed the discharge member and a stationary part 3 which may be termed the receiving member. The furnace shown in Figure 1 is suitable for use in various processes and it is to be understood that the present invention is not limited to use of the furnace in any particular manner or for any particular purpose or material but that the features of this invention are applicable at large to furnaces in which one part rotates with reference to another.

The rotating part 1 of the furnace may be provided with a pair of radially extending flanges 4 and 5 arranged to ride upon rollers, such as 6 and 7, in a manner suitable to support the rotating part of the furnace.

At the ends of the rotating part 1 adjacent the stationary parts the sealing device of the present invention may be applied. In the embodiment illustrated in the drawing, the sealing may be accomplished by providing, on the exterior of the rotating part 1, a radially extending flange or fin 8 suitably secured to a wall of the furnace as by means of an angle iron 9 suitably connected as by rivetting or welding to the adjacent parts.

A similarly arranged annular flange 10 may be connected to the adjacent stationary parts, such as the discharge member 2, so that the annular flange 10 extends substantially parallel to the annular fin 8 and in close proximity thereto with, however, a slight space therebetween sufficient to accommodate the gasket as will be later described. In order to adjust the fin 8 and the flange 10 relative to each other, it will be understood that these members may be adjustably connected respectively to the rotating member and the adjacent stationary part, as for instance, by the use of slotted connections.

At its outer edge the flange 10 is adjustably connected to annular member 11 of L-section. The member 11 extends entirely around the furnace outside of the periphery of fin 8 but leg 12 thereof extends inwardly beyond the periphery of fin 8 and is provided with a lip 13, disposed inwardly of the periphery of fin 8.

In a position opposite lip 13 a lug 14 may be provided upon flange 10 so as to form with lip 13 seats against which the gasket may be compressed by the application of pressure.

The arrangement just described provides a channel completely surrounding the outer edge of fin 8 and within this channel may be disposed a gasket 15 of suitable packing material such as flax, rubber or metal. The gasket 15 may be provided with a groove 16 of such size as to embrace the outer edge of fin 8, as shown clearly in Figure 2.

With this arrangement of parts, it will be understood that relative adjustment between member 11 and flange 10 will effect a compression of the gasket so as to accomplish a seal against flange 10 and about fin 8 and thereby prevent the escape of fluids from the interior of the apparatus while at the same time permitting rotation of furnace member 1 as fin 8 moves within the groove 16 in the gasket.

Figure 2:
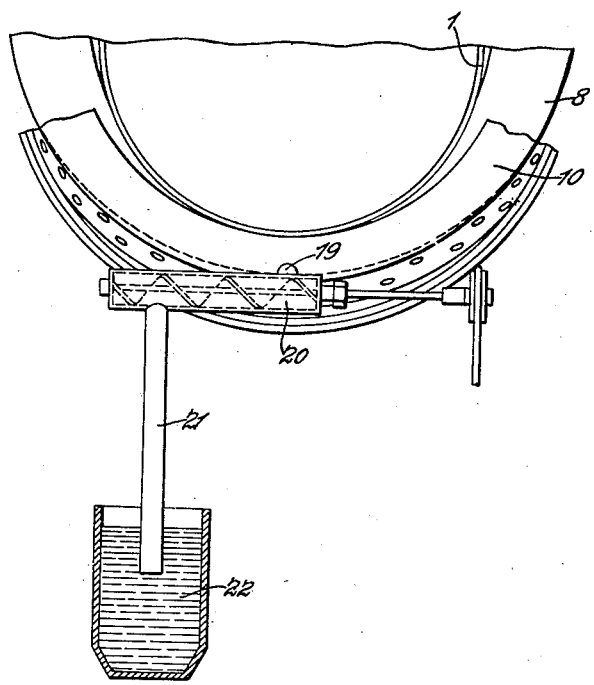
Figure 2 is a sectional view showing the seal more in detail.

As shown in Figure 2 the gasket 15 may not completely fill the channel provided by members 10 and 11 but may be so arranged as to leave a space 17. This is particularly advantageous when high pressures are developed within the apparatus as in this case fluid pressure from an external source may be introduced and applied in space 17 so as to equalize the pressures on the inside and outside of gasket 15. Such fluid under pressure may be introduced through a suitably arranged pipe 18.

Figure 3:
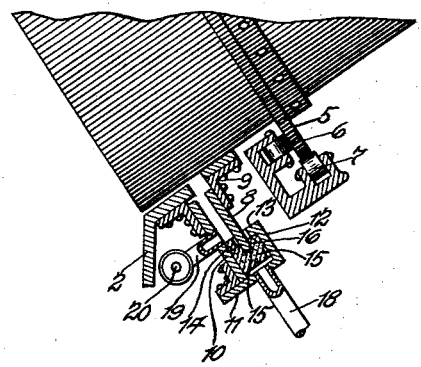
Figure 3 is a detail view showing the apparatus for removing dust from the seal.

In order to minimize the wear upon the parts of the seal of the present invention, the dust or solid particles may be continuously removed from between flange 10 and fin 8, as for instance, through a tube 19 communicating with a screw conveyor tube 20 so constructed and arranged as to continuously remove solid particles falling therein toward the left, as seen in Figure 3 and discharge them through tube 21 into a bath of liquid 22. Again it will be understood that if high pressures are developed within the apparatus, the bath 22 may be enclosed or placed under sufficient pressure to prevent the escape of gas from the apparatus through tubes 20 and 21.

While the seal of the present invention has been described in detail as applied at the lower end of rotating furnace member 1, it will be understood that the same type of seal may, if desired, be employed at the upper end of rotating member 1 or at any other point where it is desired to seal a rotating member against fluid leakage at a junction with a stationary member. It will be understood, therefore, that the invention is not limited to the precise details of the embodiment which has been hereinbefore described for the purpose of illustration, but that the features thereof are of general application to such apparatus as rotary furnaces. Such modifications and the use of such individual features and sub-combinations of features as do not depart from the spirit of this invention are, although not specifically described herein, contemplated by and within the scope of the appended claims.

I claim:

1. A device of the kind described comprising, in combination, a rotating part, a stationary part, said rotating part having a fin extending therearound, said fin having substantially parallel surfaces, a channel carried by the stationary part and extending around the rotating part in spaced embracing relation to said fin, a gasket engaging opposite parallel surfaces of said fin and incompletely filling said channel so as to leave a space in the channel beneath the gasket, and means for applying fluid pressures within said space.

2. A device of the kind described comprising, in combination, a rotating part, a stationary part, said rotating part having a fin extending therearound, a flange on the stationary part extending about the rotating part in spaced relation to the fin, means for sealing the space between said fin and flange, and means communicating with the space between said fin and flange inwardly of the sealing means for removing foreign material from said space.

3. A device of the kind described comprising, in combination, a rotating part, a stationary part, said rotating part having a fin extending therearound, a flange on the stationary part extending about the rotating part in spaced relation to the fin, means for sealing the space between said fin and flange, and means communicating with the space between said fin and flange inwardly of the sealing means for removing foreign material from said space, said last mentioned means being hermetically sealed.

4. A device of the kind described comprising, in combination, a rotating part, a stationary part, one of said parts having an annular flange extending outwardly therefrom, a gasket carried by the other part and embracing the edges of said annular flange in sealing relation thereto, and means for withdrawing solid matter from the space within said gasket.

ALBERT J. MEIER.